UNITED STATES PATENT OFFICE.

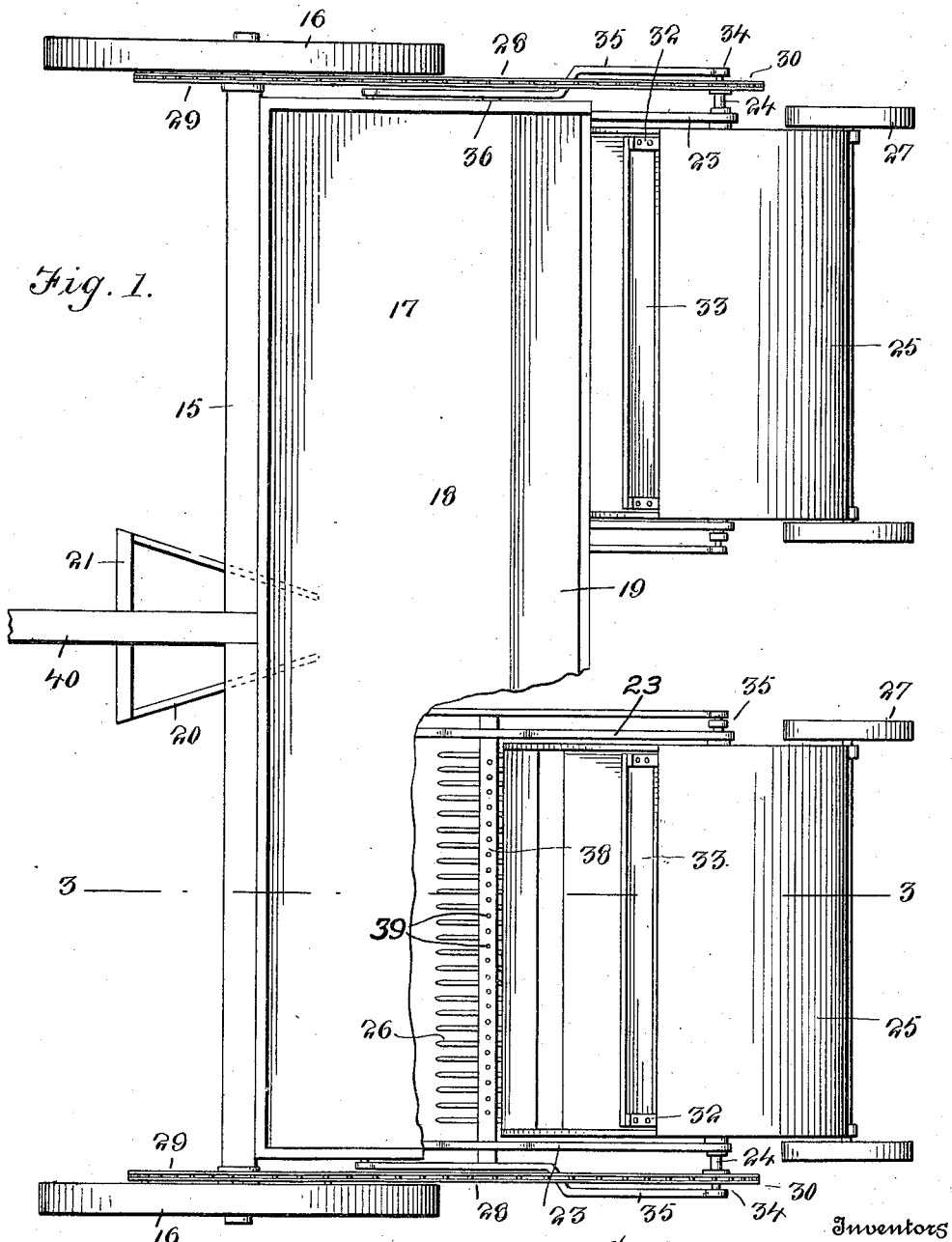

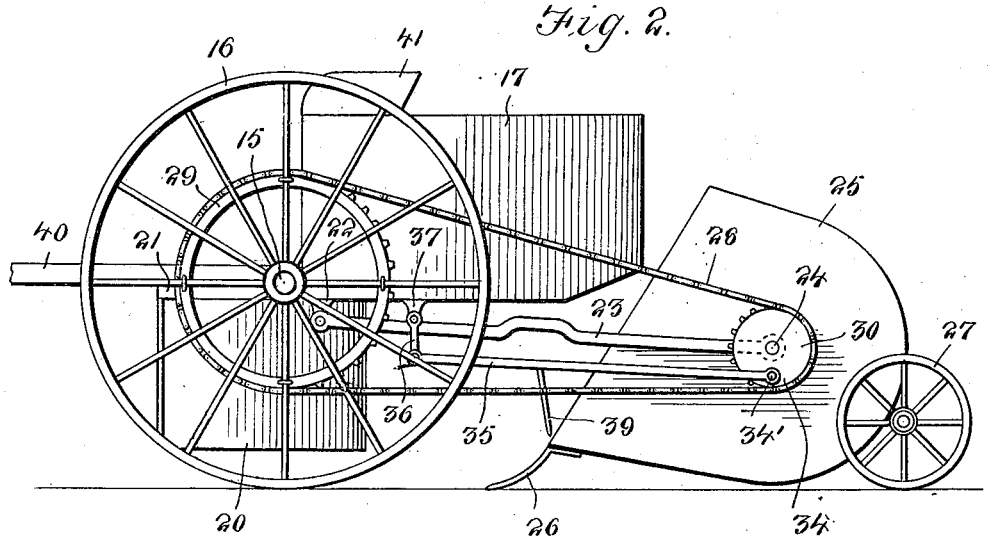

CARL OLSEN AND WILLIAM C. STAUTZENBERGER, OF BEEVILLE, TEXAS.

DEVICE FOR CATCHING INSECTS.

1,142,614.      Specification of Letters Patent.    Patented June 8, 1915.

Application filed February 4, 1914. Serial No. 816,494.

*To all whom it may concern:*

Be it known that we, CARL OLSEN and WILLIAM C. STAUTZENBERGER, citizens of the United States, residing at Beeville, in the county of Bee and State of Texas, have invented new and useful Improvements in Devices for Catching Insects, of which the following is a specification.

This invention relates to machines or devices for catching insects, and it has particular reference to a device for catching boll weevils.

The invention has for its object to produce a device or machine of the class described which will be simple and inexpensive in construction and efficient in operation and by means of which the punctured leaves and squares containing the eggs deposited by the insects may be gathered to be subsequently destroyed.

A further object of the invention is to produce a simple and effective machine of the class described in which the punctured leaves and squares that drop on the ground will be gathered into a casing containing a revolving reel or fan whereby they are thrown from the casing into a receptacle from which they may be subsequently removed and destroyed.

A further object of the invention is to produce a machine of the character described comprising a wheel supported frame structure, means for agitating the plants, a fan casing, means for gathering the punctured leaves and squares into the fan casing, a receptacle, and means for conveying the material from the fan casing to the receptacle, the moving parts of the device being driven from the ground wheels or supporting wheels of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention, certain parts having been broken away for the purpose of exposing subjacent parts. Fig. 2 is an end view of the device. Fig. 3 is a vertical sectional view taken on the line 3—3 in Fig. 1.

Corresponding parts in the several figures are denoted by like characters of reference.

An axle 15 mounted on ground wheels 16 supports a box or receptacle 17, the rear end of which is open and the bottom of which, 18, has an upturned rear portion 19 over which material may be thrown into the receptacle and which will partly obstruct the escape of such material through the open rear end. The axle 15 also supports a pair of downwardly extending forwardly diverging rearwardly converging plates or members 20 which are connected together at their upper forward edges by a cross bar 21. The function of these plates or members is to agitate the plants that are to be operated upon, and they are of such dimensions as to admit said plants between them, the plates being sufficiently spaced apart at their rear ends to permit the plants to pass between them without being injured.

Hangers or brackets 22 that extend downwardly from the forward portion of the bottom of the receptacle 17 serve for the attachment of the forward ends of pivoted bars or links 23 of which two pairs have been shown, said links or bars supporting at their rear ends a pair of shafts 24, said shafts having bearings in the side walls of casings 25. These casings which may be described as being of approximately semi-elliptical or semi-oval shape are open at their front ends facing the open rear end of the receptacle 17. The lower portion of each casing 25 is provided with a ground engaging rake 26 at the front edge thereof, the teeth of said rake being curved so as to constitute runners that will ride easily over the ground and assist in gathering fallen leaves and the like without hindering the progress of the machine. The casings may be provided with wheels 27 trailing behind and supporting the weight thereon.

Motion is transmitted to the shafts 24 from the ground wheels 16 by means of chains or link belts 28, sprocket wheels 29 associated with the ground wheels, and sprocket wheels 30 mounted on the respective shafts 24. Mounted on the shafts within the respective casings are fans or beaters comprising hubs 31 having radial arms 32 carrying wings 33.

The shafts 24 are provided with terminal cranks 34 one of which may be in the nature of a wrist pin 34' associated with the sprocket wheel 30. Pivoted on said cranks are the rearward ends of bars 35, the forward ends of which are pivotally connected with links 36 depending from brackets 37 on the underside of the floor 18 of the receptacle 17. The link bars at the two sides of each casing are connected together by a cross bar 38 having depending rake teeth 39 which, when the machine is in operation, are moved orbitally to assist in conveying material passing over the rake teeth 26 into the lower part of the casings 25 where it will be taken hold of by the fans or beaters and moved through the casings and thrown by the action of said fans or beaters over the inclined bottom portion 19 into the receptacle 17.

The device is equipped with means for the attachment of draft animals including a tongue 40 and with a seat 41 for the driver or operator.

From the foregoing description, taken in connection with the drawings hereto annexed, the operation and advantages of this invention will be readily understood. The machine is arranged to straddle a row of growing plants which will pass between the agitating plates or members 20, which latter serve to compress the branches of the plants which, on escaping between the rear ends of said plates, will be permitted to suddenly expand, being thus shaken in such a fashion that the leaves and squares which have been loosened by being punctured by the weevils will drop upon the ground. As the machine progresses, the rakes 26 will gather the leaves and squares which, being further subjected to the action of the rakes 39, will be moved into the lower parts of the casings 25 and thence transferred by the action of the fans or beaters to the receptacle 17 from which, when a sufficient quantity has been accumulated, the contents may be removed and destroyed.

Having thus described the invention, what is claimed as new, is:—

1. In a machine of the class described, a wheel supported receptacle open at its rear end, said receptacle being supported at a proper elevation to enable it to pass over a row of cotton plants, rearwardly converging spaced agitating members depending from said receptacle, casings trailing in rear of the receptacle, said casings being open at the front and spaced apart to admit a row of plants therebetween, gathering means associated with the casings, and means for transmitting material gathered in the casings to the receptacle.

2. In a machine of the class described, a wheel supported receptacle open at its rear end, said receptacle being supported at a proper elevation to pass above a row of cotton plants, plant agitating means depending from the receptacle, casings trailing in rear of the receptacle, said casings being spaced apart to admit a row of plants therebetween, and said casings having open and unobstructed front ends which are spaced from the open rear end of the receptacle, ground engaging rakes associated with the casing at the lower front edges thereof, and means for transmitting material gathered in the casings to the receptacle.

3. In a machine of the class described, a wheel supported receptacle open at its rear end and supported at a suitable elevation to pass over a row of plants, plant agitating means connected with and depending from the receptacle, a pair of casings trailing in rear of the receptacle, said casings having open front ends and said casings being spaced apart to admit a row of plants therebetween, shafts extending through the casings, fans on said shafts within the casings whereby the material gathered therein may be forcibly thrown into the receptacle through the open rear end thereof, lugs depending from the bottom of the receptacle, and links connecting said lugs with the fan carrying shafts enabling the casings to move vertically independently of the receptacle.

4. In a machine of the class described, a wheel supported receptacle open at its rear end and having a bottom provided with an upturned rear portion, plant agitating means connected with the receptacle, casings trailing in rear of the receptacle and having open front ends, said casings being of substantially semi-oval form, ground engaging rakes associated with the casings, driven shafts in the casings, fans on said shafts within the casings, cranks at the ends of the shafts, links depending from the bottom of the receptacle, bars connecting said links with the cranks, and cross bars connecting said bars in pairs and having depending rake teeth.

In testimony whereof we affix our signatures in presence of two witnesses.

CARL OLSEN.
WILLIAM C. STAUTZENBERGER.

Witnesses:
R. L. Cox,
PAUL SHILO.